US008825410B2

(12) United States Patent
Moore

(10) Patent No.: US 8,825,410 B2
(45) Date of Patent: Sep. 2, 2014

(54) MOVE-OUT CORRECTION OF SEISMIC DATA

(71) Applicant: WesternGeco L.L.C., Houston, TX (US)

(72) Inventor: Ian Moore, Queenstown (NZ)

(73) Assignee: Western Geco L.L.C., Houston, TX (US)

( * ) Notice: Subject to any disclaimer, the term of this patent is extended or adjusted under 35 U.S.C. 154(b) by 0 days.

(21) Appl. No.: 13/952,755

(22) Filed: Jul. 29, 2013

(65) Prior Publication Data

US 2013/0311100 A1 Nov. 21, 2013

Related U.S. Application Data

(63) Continuation of application No. 12/682,295, filed as application No. PCT/GB2008/003713 on Nov. 3, 2008, now Pat. No. 8,521,434.

(30) Foreign Application Priority Data

Nov. 19, 2007 (GB) .................................. 0722654.1

(51) Int. Cl.
*G01V 1/18* (2006.01)
(52) U.S. Cl.
USPC .......................................................... 702/18
(58) Field of Classification Search
CPC ..... G01V 1/364; G01V 1/362; G01V 1/3808; G01V 1/36; G01V 1/0001; G01V 1/02; G01V 1/003; G01V 1/16; G01V 1/24; G01V 1/28; G01V 1/38
USPC ......... 702/6, 11, 14, 17, 18, 85, 98, 111, 138, 702/183, 191
See application file for complete search history.

(56) References Cited

U.S. PATENT DOCUMENTS 6,510,390 B1 1/2003 Bunting et al.
6,512,980 B1 * 1/2003 Barr .................................. 702/1

(Continued)

FOREIGN PATENT DOCUMENTS

EP 1879052 A2 1/2008
FR 2884930 A1 10/2006

(Continued)

OTHER PUBLICATIONS

Chen et al., "Analysis of error in reconstruction of two-dimensional signals from irregularly spaced samples," IEEE Transactions on Acoustics, Speech and Signal Processing, 1987, vol. ASSP-35(2): pp. 173-180.

(Continued)

*Primary Examiner* — Mohamed Charioui

(57) ABSTRACT

A method of processing seismic data including measurement data and their gradients to obtain gradients of move-out corrected data, comprising deriving gradients of the measurement data, deriving a first term comprising applying a move-out correction function to the measurement data; deriving a second term by applying the move-out correction function to the gradients and deriving gradients of move-out corrected data by adding the first term and the second term. The gradients of move-out corrected data are used to process physical properties of the earth's interior. The method may be used prior to any data processing algorithm which uses measurement gradient data in which move-out correction is applied prior to the algorithm, either because the algorithm makes a zero offset assumption or because it is beneficial for the algorithm to operate on move-out corrected data to reduce aliasing.

15 Claims, 9 Drawing Sheets

(56) References Cited

U.S. PATENT DOCUMENTS

| | | | |
|---|---|---|---|
| 6,751,558 B2 * | 6/2004 | Huffman et al. | 702/14 |
| 6,775,618 B1 * | 8/2004 | Robertsson et al. | 702/14 |
| 7,348,893 B2 * | 3/2008 | Huang et al. | 340/854.3 |
| 2004/0141355 A1 | 7/2004 | Robertsson et al. | |
| 2004/0230378 A1 * | 11/2004 | Proett et al. | 702/6 |
| 2006/0227657 A1 | 10/2006 | Tveide et al. | |
| 2006/0239117 A1 | 10/2006 | Singh et al. | |
| 2006/0291328 A1 | 12/2006 | Robertsson et al. | |
| 2008/0225642 A1 | 9/2008 | Moore et al. | |
| 2008/0291779 A1 * | 11/2008 | Muyzert et al. | 367/20 |
| 2009/0003132 A1 | 1/2009 | Vassallo et al. | |
| 2010/0299069 A1 | 11/2010 | Moore | |
| 2010/0312481 A1 | 12/2010 | Moore | |
| 2010/0329077 A1 | 12/2010 | Ozbek et al. | |

FOREIGN PATENT DOCUMENTS

| | | | |
|---|---|---|---|
| GB | 2444953 A | | 6/2008 |
| WO | 02073239 A1 | | 9/2002 |
| WO | 2005114258 A1 | | 12/2005 |
| WO | 2008014080 A2 | | 1/2008 |
| WO | 2009066047 | | 5/2009 |

OTHER PUBLICATIONS

Ozbek et al., "Anti-alias optimal interpolation with priors," 72nd EAGE Conference and Exhibition incorporating SPE EUROPEC, 2010, Barcelona, Spain: pp. 1-5.

Ozdemir et al., "G025: Interpolation of irregularly sampled data by matching pursuit" 70th EAGE Conference and Exhibition, Rome, Italy, Jun. 2008: pp. 1-5.

Robertsson et al., "On the use of multicomponent streamer recordings for reconstruction of pressure wavefields in the crossline direction," Geophysics, 2008, vol. 73(5). pp. A45-A49.

Yen, "On nonuniform sampling bandwidth-limited signals," IRE Transactions on Circuit Theory, 1956, vol. 3: pp. 251-257.

Combined Search and Examination Report of British Application No. GB 0722651.7 dated Mar. 10, 2008: pp. 1-5.

International Search Report and Written Opinion of PCT Application No. PCT/GB2008/003617 dated Sep. 7, 2010: pp. 1-12.

Combined Search and Examination Report of British Application No. GB 0722654.1 dated Mar. 4, 2008: pp. 1-6.

International Search Report and Written Opinion of PCT Application No. PCT/GB2008/003713 dated Feb. 10, 2009: pp. 1-15.

* cited by examiner

MOVE-OUT CORRECTION OF SEISMIC DATA

CROSS RELATED APPLICATIONS

This application is a continuation application of co-pending U.S. patent application Ser. No. 12/682,295 filed Jul. 16, 2010, which is a U.S. National Stage Application under 35 U.S.C. §371 of Application No. PCT/GB2008/003713 filed Nov. 3, 2008, which claims priority to British Patent Application No. 0722654.1 filed Nov. 19, 2007; all of which are incorporated herein by reference in their entireties.

BACKGROUND

The present invention relates to the application of move-out correction to seismic data.

Seismic data are typically gathered using an array of detectors. In the case of marine data, hydrophones measure pressure fluctuations in the water caused by incoming seismic waves. Geophones measure vector quantities such as displacement, velocity or acceleration. In the case of marine data, a plurality of cables or streamers, which are spaced apart typically by about 100 meters, are towed behind a boat. Each cable has detectors spaced along the cable at intervals. In the case of land data, a geophone array is laid out on the ground with the geophones in an approximate grid formation. The detector array detects seismic signals from reverberations of a signal from a seismic source, such as an airgun for marine data. In Ocean Bottom (OBC or OBS) acquisition, a detector array is fixed on the sea bed. The source may be an airgun mounted on a boat.

The distance between a seismic source and a receiver is known as the offset. A flat reflector will generate an event of an approximately hyperbolic form as a function of offset. Move-out correction can be viewed as a process that compensates for offset by distorting the traces along the time axis in a manner that depends on a velocity function. The aim may be to simulate zero offset data and thus "flatten" the hyperbolic event, using a velocity function selected to match the velocity of the seismic energy through the water and the earth. This may be because the algorithm involves a zero offset assumption, in which case an accurate velocity function is desirable. One example of a data processing algorithm of this type is migration. However, very often move-out correction is applied preceding another data processing algorithm, typically to reduce aliasing effects. If the purpose is simply to reduce the slope of the hyperbolic events to avoid aliasing, an accurate velocity function is not required. In this case, the data are often purposely under corrected using a velocity function faster than one which would create zero offset data. After the data processing algorithm is applied, the move-out correction is reversed or "backed off". One example of a type of data processing algorithm in which move-out correction is used in this way is interpolation.

Recent developments in marine acquisition record not only the pressure using hydrophones but also record particle velocity or acceleration in directions parallel to the surface. This allows the gathering of pressure gradient (or spatial derivative) data, in addition to pressure data. New algorithms are being developed which utilize both pressure data and pressure gradient data. However, if move-out correction is required it is not correct simply to apply move-out correction to the gradient, because this does not yield the derivative of the move-out-corrected data. Move-out-correction and differentiation do not, in general, commute.

SUMMARY

This summary is provided to introduce a selection of concepts that are further described below in the detailed description. This summary is not intended to identify key or essential features of the claimed subject matter, nor is this summary intended to be used as an aid in limiting the scope of the claimed subject matter.

According to the present invention, a method of processing seismic data including measurement data and their gradients for geophysical survey, comprises:
  receiving measurement data from seismic receivers;
  deriving gradients of the measurement data;
  deriving a first term comprising applying a move-out correction function to the measurement data;
  deriving a second term by applying the move-out correction function to the gradients;
  deriving gradients of move-out corrected data by adding the first term and the second term; and
  using the gradients of move-out corrected data to process physical properties of the earth's interior.

In some data processing algorithms, measurement data and their gradients are used. The measurement data may include pressures, at least one component of displacements, velocities or accelerations. It is also desirable or necessary in many algorithms for move-out correction to be applied prior to the application of the algorithm. Move-out correction is when a velocity function is used to transform the seismic traces along a time axis, to compensate for an offset between source and receiver. Move-out correction is often applied before another processing algorithm, either because zero offset assumptions are made by that algorithm (for example, in migration) or to reduce aliasing. If the purpose is to reduce aliasing, it is not necessary that the move-out function completely compensates for the offset, just that the data are transformed sufficiently to reduce the aliasing effects. As the move-out is "backed off" after the processing algorithm, there is no need for the function to compensate accurately for offset. If both pressure data and pressure gradient data are required by the algorithm (assuming the measurement data are pressure data), then it is necessary to obtain both the move-out corrected pressure data and the gradients of the move-out corrected data. The present invention allows the calculation of the latter from the pressure data and the pressure gradient data.

Preferably, the method comprises the steps of:
  a) computing a time-derivative of the pressure data by differentiation of the pressure data with regard to time;
  b) applying the move-out correction function to the time-derivative of the pressure data;
  c) computing a gradient of the move-out correction function;
  d) multiplying the results of steps (b) and (c) to derive the first term.

In one embodiment, the move-out correction function is a hyperbolic function.

The present invention may be used in combination with a method further comprising spatially interpolating measurement data using the move-out corrected measurement data and the gradients of the move-out corrected data. In the interpolation, by use of the gradients of the measurement rather than the measurement data alone, the aliasing problem can be greatly reduced. The pressure data may be measured by hydrophones (for marine data), and the gradients of pressure may be derived from measurements of particle velocity or acceleration in the direction of interpolation. The gradients of pressure may also be derived by differentiation of the pressure data with regard to spatial directions.

Preferably, the interpolation comprises applying an interpolation operator calculated by assuming that an interpolated measurement data comprises a linear combination of the known measurement data at locations $x_i$ and the gradients at locations $x_\alpha$, with operator coefficients $w_i$ and $w_\alpha$, respectively; and calculating the coefficients by minimizing an error function. Preferably, minimizing an error function comprises using a least squares method. However, for example, an L-1 method may be used instead of an L-2 (least squares) method.

The interpolation operator may include a factor relating to the noise level in the known values. In the final operator, the effect of this is that the higher the noise in the measurement data, the more weight is given to the gradient data in performing the interpolation and vice versa.

In one embodiment, the direction of interpolation is substantially perpendicular to a cable connecting a plurality of geophones/hydrophones. Thus, the method can be used to interpolate extra lines of data, thus simulating the use of more closely spaced cables. In the case of marine data acquired using a plurality of substantially parallel streamers having hydrophones spaced along each streamer, and the method is used to interpolate data points between the streamers, thus simulating the use of more closely spaced streamers in the acquisition.

Preferably, the seismic data are marine data acquired using a plurality of substantially parallel streamers having hydrophones spaced along each streamer, and the method is used to interpolate data points between the streamers.

Preferably, the pressure data is in the form of shot gathers and that all the data used for interpolation of any one point comes from the same shot. Preferably the pressure data are calculated from raw measurements of particle velocity or acceleration.

In one embodiment of the present invention, the processed seismic data may be used to determine physical properties of the earth's interior.

BRIEF DESCRIPTION OF THE DRAWINGS

Preferred embodiments of the present invention will now be described with reference to the accompanying drawings, in which.

DETAILED DESCRIPTION

In the following description, numerous details are set forth to provide an understanding of the present disclosure. However, it will be understood by those skilled in the art that the present disclosure may be practiced without these details and that numerous variations or modifications from the described embodiments are possible.

Figure 1:
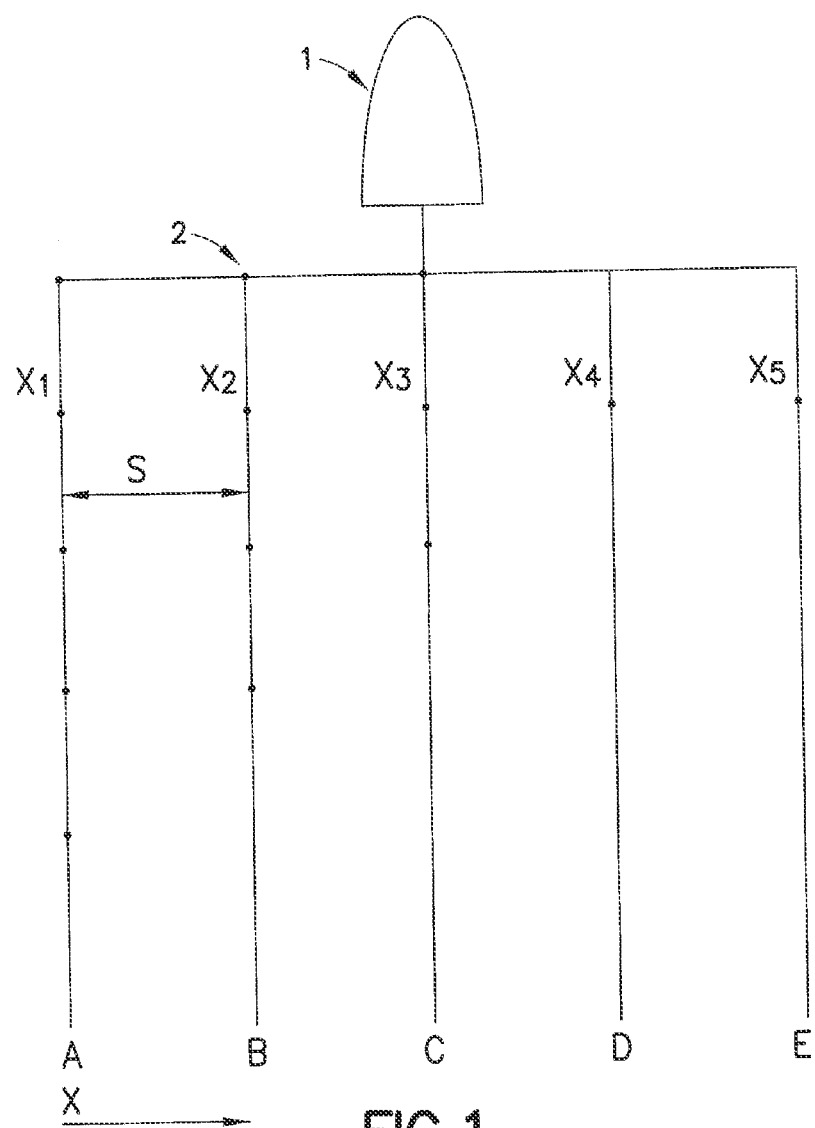
FIG. 1 shows schematically the layout of a marine seismic data acquisition system.

FIG. 1 illustrates a typical layout of an acquisition system for marine seismic data. A plurality of streamers, in this case five streamers A, B, C, D, E are towed behind a boat 1. The typical spacing S between the streamers A, B, C, D, E is 50 to 100 meters although the streamers A, B, C, D, E are only fixed at the end adjacent to the boat and therefore will drift so that spacing S becomes non-uniform, particularly towards the free ends of the streamers A, B, C, D, E. Each streamer A, B, C, D, E has a plurality of sensors 2 equally spaced along the length of the streamer. At each sensor position $x_n$, a hydrophone records pressure changes which correspond to seismic signals from reverberations from a shot fired by a source. At each sensor position $x_n$, at least one sensor records particle velocity or acceleration. There may be multiple velocities/acceleration sensors recording the velocity/acceleration in different directions. So measurement data may include some or all of these data. In this case, the value of interest is the velocity/acceleration reading in the x direction, i.e., substantially perpendicular to the streamer direction.

Velocity or acceleration readings can readily be converted to pressure gradient, in this case the pressure gradient of interest being $\partial P/\partial x$. This can be calculated from acceleration data by the simple application of Newton's second law:

$$\partial P/\partial x = -\rho a$$

where $\rho$ is the water density and $a$ is the x-component of acceleration.

If the sensors measure the particle velocity, these can readily be converted to acceleration values because the data is typically well sampled (for example every 2 ms) in the time direction and so the acceleration can readily be derived by differentiation.

The locations of the pressure readings and the pressure gradients may be the same. However, even if the sensors are located at the same location, in the case of instrument failures, pressure and/or gradient information may be missing at one or more locations and therefore the locations of the pressure values and the pressure gradient values are not necessarily the same. Furthermore, it may be desirable to place the velocity/acceleration sensors more closely than the pressure sensors to remove noise that would otherwise be aliased.

Figure 2:
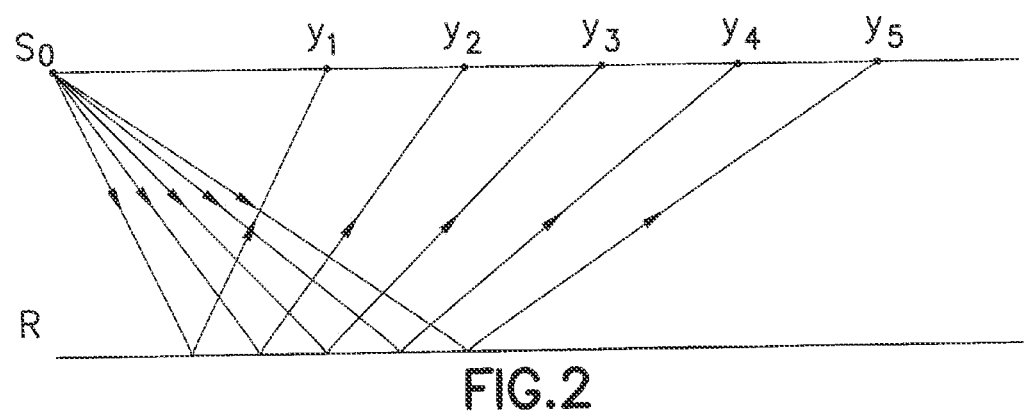
FIG. 2 illustrates move-out of seismic data.

FIG. 2 illustrates the concept of move-out. A source $S_0$ generates a seismic signal which is reflected from a reflector R and received at a plurality of receivers at offsets $y_n$, the offset being the distance from source to receiver. Each receiver will detect the reflection at an arrival time which is dependent on the offset and the velocity at which the seismic energy travels through the medium (which will be partly water, partly the earth). The move-out is the difference in arrival time between the actual arrival time and a theoretical arrival time for a receiver at zero offset. For a theoretical flat reflector and a uniform velocity medium, the move-out will be a hyperbolic function of offset.

For some seismic data processing algorithms, such as some migration algorithms, it is necessary for the algorithm to operate on zero offset data, so before application of the algorithm the data are corrected using a move-out correction function based on the velocity of the medium, such that all of the data are transformed to appear as if they were recorded at zero offset. It is also common to apply move-out correction to seismic data before some data processing algorithms in order to reduce the slope of events in shot gathers to reduce aliasing, and then to remove this correction afterwards. In this case an accurate velocity function is not required. Indeed, the data is often purposely under corrected using a velocity function faster than one which would create zero offset data. In this case, the application of the move-out correction function reduces the slope of the hyperbolic events but does not completely flatten them. After the data processing algorithm is applied, the move-out correction is reversed or "backed off." One example of a type of data processing algorithm in which move-out correction is used in this way is interpolation.

Whilst the application of move-out correction is straight-forward for interpolation algorithms that involve only data, it is more complicated for algorithms that make use of spatial derivatives (i.e., numerical results of gradients) of those data. It is not correct simply to apply move-out correction to the derivatives, because this does not yield the derivative of the move-out-corrected data. Move-out-correction and differentiation do not, in general, commute.

Suppose we have recorded data $p(x, y, t)$, where x and y are the components of the offset vector, and t is two-way travel time at that offset. Suppose also that we have the spatial derivative of those data, $p_x(x, y, t)$. The move-out-corrected data, $M(p)(x, y, t_0)$ are given by $$M(p)(x,y,t_0) = p(x,y,t_m(t_0,x,y))$$

where $t_0$ is the zero-offset time, and $t_m(x, y, t_0)$ may be the move-out function, which gives the time at offset (x, y) corresponding to $t_0$. However, the move-out function need not move the data completely to zero offset. As the purpose is simply to reduce the slope of the events to avoid aliasing, a very approximate move-out function can be used, or one which under-corrects the data (i.e., the velocity function is slightly faster than for zero offset correction. The above formula assumes that move-out correction does not include stretch compensation, which would bring in an extra factor of $\partial t_m/\partial t_0$.

The spatial derivative of $M(p)(x, y, t_0)$ is given by $$M(p)_x(x, y, t_0) = p_x(x, y, t_m(x, y, t_0)) + p_t(x, y, t_m(x, y, t_0))t_{m,x}(x, y, t_0)$$

$$= M(p_x)(x, y, t_0) + M(p_t)(x, y, t_0)t_{m,x}(x, y, t_0)$$

The first term on the right is simply the move-out-corrected derivative. The second term is a correction to this that depends on both the time-derivative of the recorded data and the gradient of the move-out function. Fortunately, both of these are generally easy to compute because the data are well-sampled in time, and the move-out function is an analytical function of offset. If the move-out correction is perfect, in the sense that it renders the data independent of offset, then the second term cancels the first to yield a zero derivative. In general, however, there will be inaccuracies in the move-out function, and move-out correction will create offset-dependent wavelet stretch, such that the derivative will be non-zero.

Hyperbolic Move-Out

For the specific case of hyperbolic move-out, we have $$t^2_m(x,y,t_0) = t^2_0 + (x^2+y^2)/v^2(t_0)$$

where $v(t_0)$ is the rms velocity. Differentiating this gives $$t_{m,x} = x/v^2 t_m$$

in which it should be noted that the numerator is the component of the offset in the direction in which the gradient is required.

Linear Move-Out

The corresponding equations for linear move-out are $$t_m(x,y,t_0) = t_0 + \sqrt{(x^2+y^2)}/v(t_0)$$

and $$t_{m,x} = x/(v\sqrt{(x^2+y^2)})$$

Figure 3:
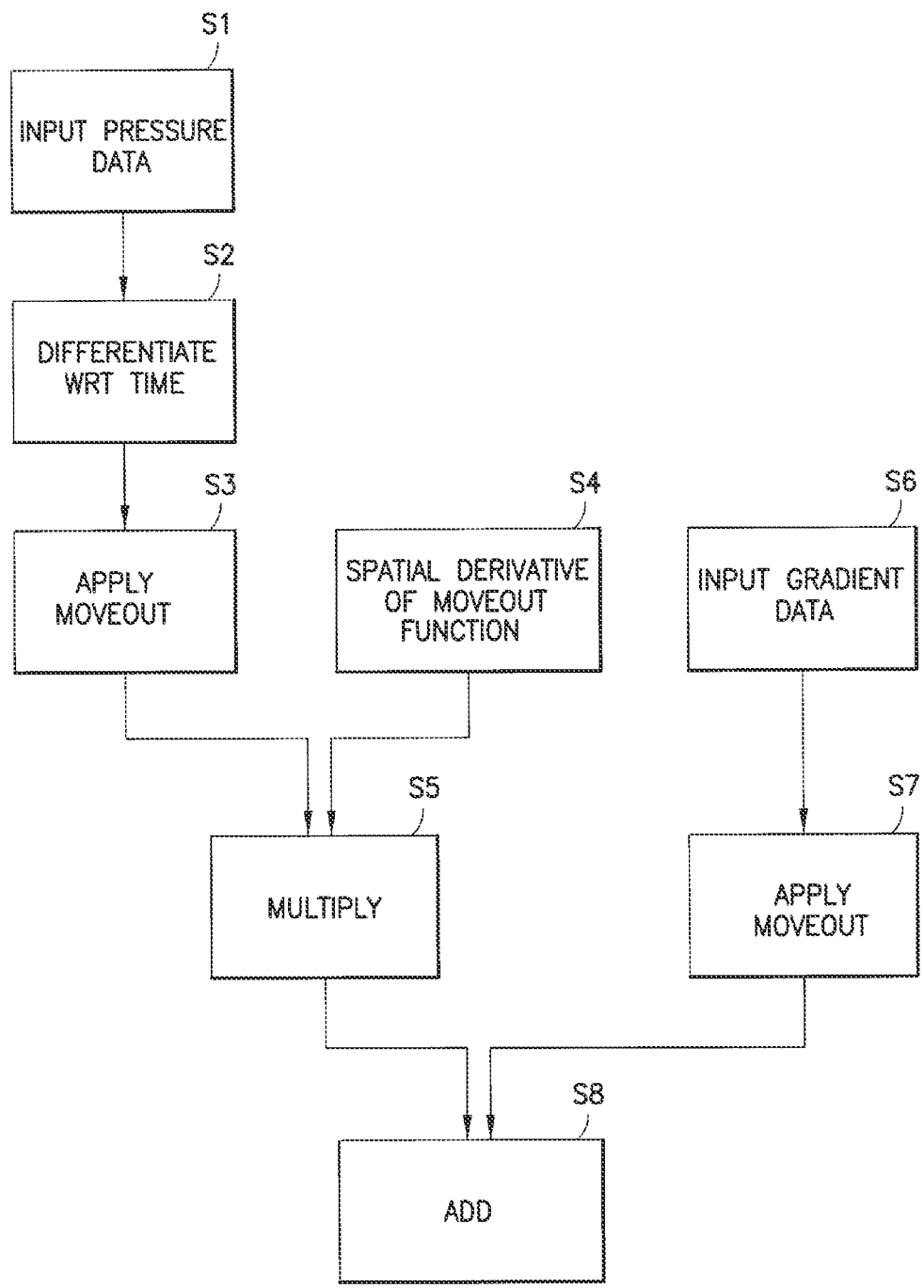
FIG. 3 is a flow diagram illustrating a method for obtaining gradients of move-out corrected data.

FIG. 3 illustrates a flow diagram for the calculation of the gradient of the move-out corrected data.

In step S1, the pressure data $p(x, y, t)$ is input and in step S2 the time derivative $p_t(x, y, t)$ is computed. In step S3, the move-out correction is applied to $p_t(x, y, t)$ to give $M(p_t)(x, y, t_0)$. In step S4, the gradient (spatial derivative) $t_{m,x}(x, y, t_0)$ of the move-out function $v(t_0)$ is calculated using the hyperbolic formula.

In step S5, the results of steps S3 and S4 are multiplied. In step S6, the pressure gradient data is input and the move-out correction is applied to give $M(p)(x, y, t_0)$. In step S7, the results of steps S5 and S6 are added to give the gradients of the move-out corrected pressure values.

Figure 4:
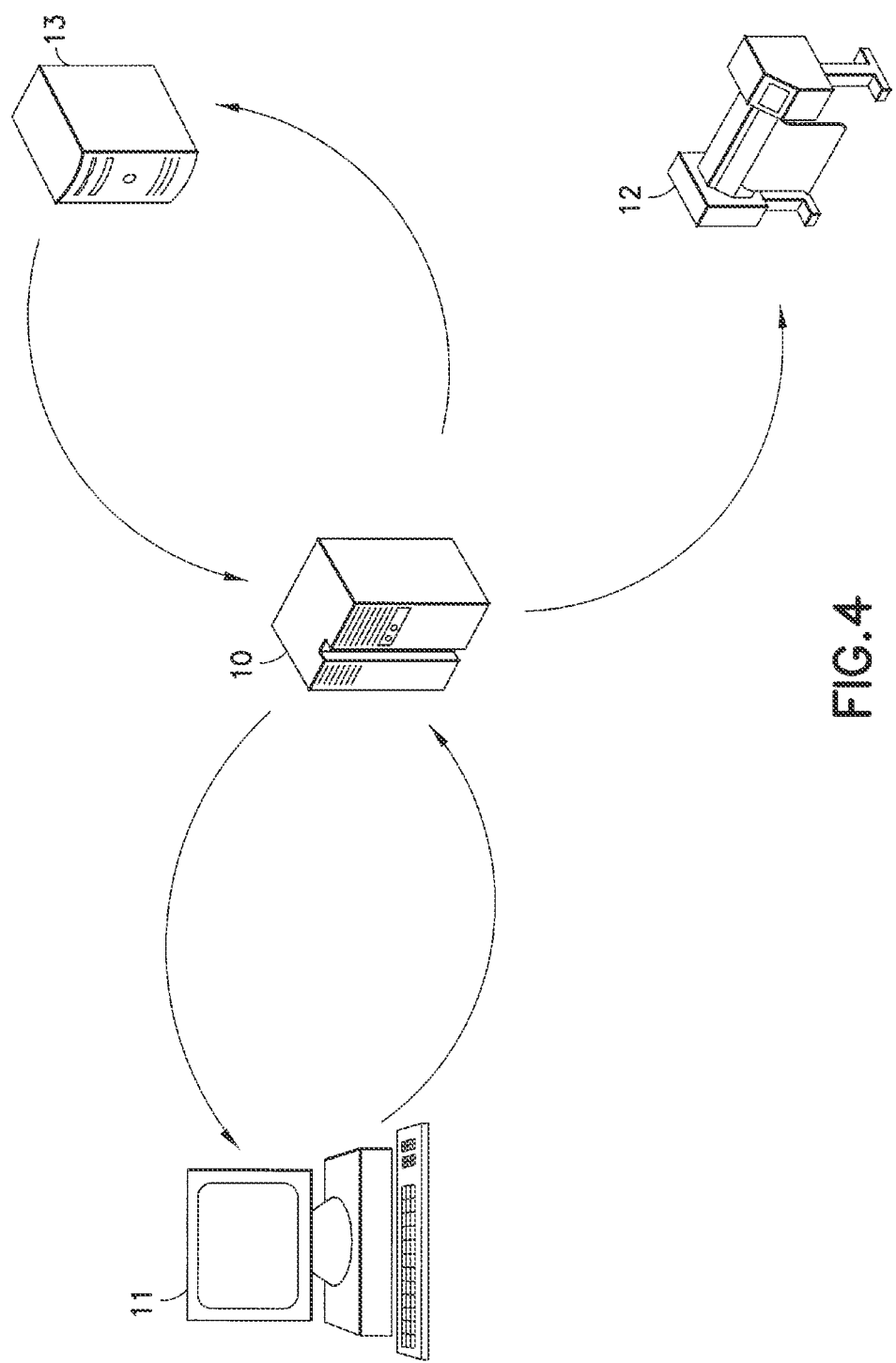
FIG. 4 illustrates a system for carrying out the method of the invention.

FIG. 4 illustrates a typical system for processing seismic data. Acquired seismic data is stored in a storage means 13, which may be a hard drive, tape or disk or any other form of data storage. A user terminal 11 is used by an operator to input parameters and instructions to build a suitable processing flow for data, which is submitted to a processor 10, which loads the appropriate data from the storage means 13 and carries out the processing steps in accordance with the user's instructions. The processor 10 then outputs processed data to the storage means 13 (or to a separate storage device). The processor may also send results to the user terminal 11, and/or a notification that the processing is complete. The processing means 10 may also send output data to a printer 12.

Figure 5:
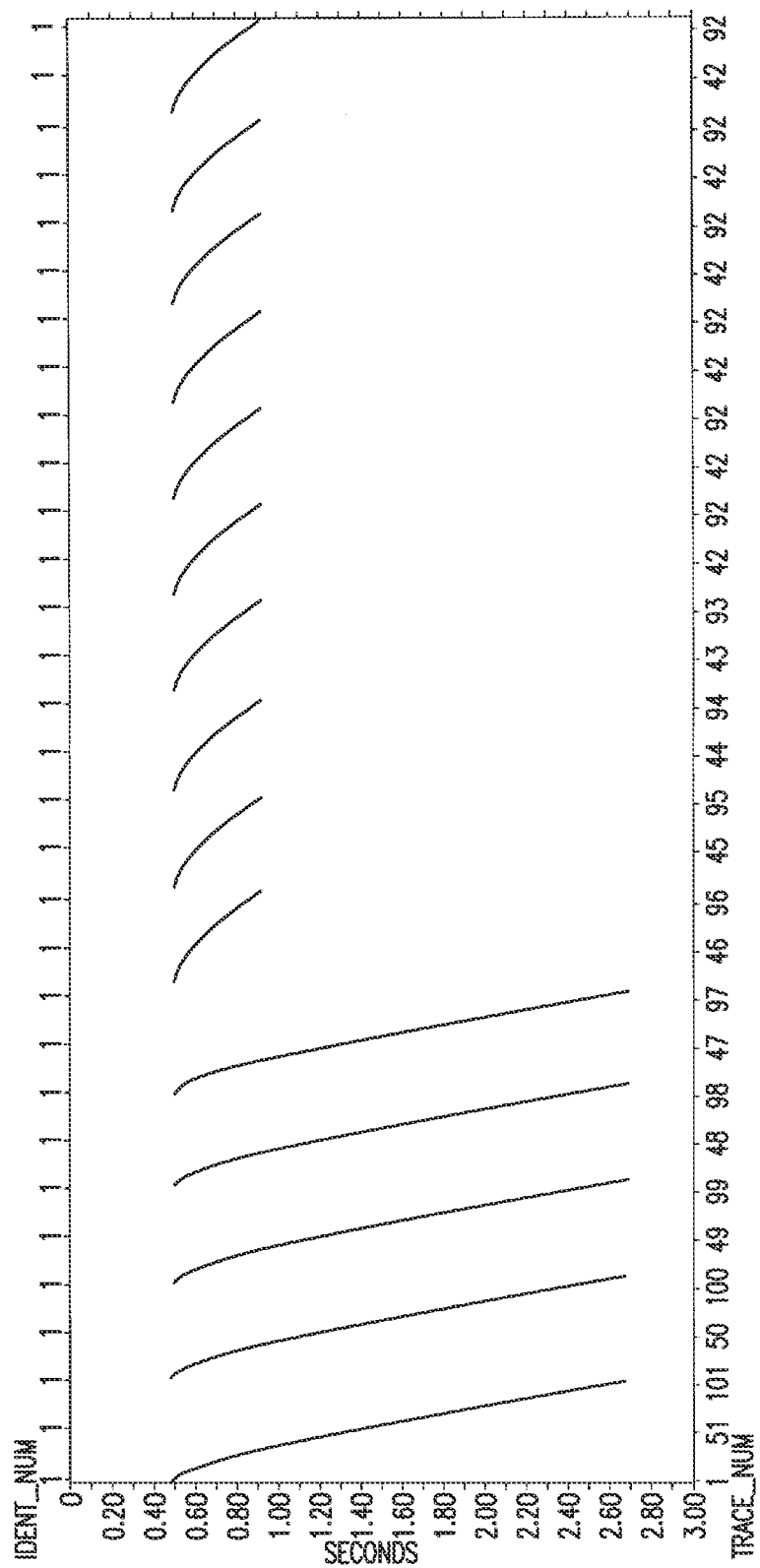
FIG. 5 shows an example of the process applied to a synthetic dataset.

FIG. 5 shows an example of the process applied to a simple synthetic dataset. The first five gathers are the raw pressure gradients. The center five are the gradients of NMO corrected pressure calculated in accordance with the invention, and the final five are pressure gradients derived by direct differentiation of pressure data.

Application to Spatial Interpolation

One example of an algorithm where the present invention is applicable is spatial interpolation using both pressure values and pressure gradient values. With reference to FIG. 1, it may be desirable to interpolate additional data values between the streamers, e.g., interpolating between points $x_1$ and $x_2$. In this case, move-out correction is applied to the pressure data and the gradients of the move-out corrected pressures are obtained by the above method before interpolation in order to reduce aliasing, and then the move-out correction is reversed after interpolation.

In the discussion below, the pressure data and the pressure gradient data are the move-out corrected pressure data and the gradients of the move-out corrected pressures obtained by the above method.

The locations of the known pressure readings and the pressure gradients detected by the hydrophones and the velocity/acceleration sensors may be the same. However, as discussed above, the locations of the pressure values and the pressure gradient values are not necessarily the same. It may be desirable to place the velocity/acceleration sensors more closely than the pressure sensors to remove noise that would otherwise be aliased. In the processing, interpolation may use the finely spaced values, or the velocity/acceleration value may be interpolated to the same spacing as the pressure values, and then the pressure data may be interpolated using co-located measurements. The following treatment therefore does not assume the locations are the same.

Suppose (in 1D) that we have pressure data at locations $\{x_i; i=1, \ldots, n_d\}$ and gradients at locations $\{x_\alpha; \alpha=1, \ldots, n_g\}$. Note the use of different subscripts for the locations of the data and gradients, respectively, so that the locations where the gradients are recorded need not be the same as those where the data are recorded.

Suppose we wish to interpolate the data to a location y. Assume that the interpolated datum at y is a linear combination of the irregular data and the gradients, with coefficients $w_i$ and $w_\alpha$ respectively (the operator). Consider the interpolation of a function $d(x)$ in the presence of noise. The operator is designed such that the error, $$\epsilon_n = \Sigma_i w_i [d(x_i)+n_i] + \Sigma_\alpha w_\alpha [d'(x_\alpha)+n_\alpha] - d(y)$$

is small for all functions $d(x)$ of interest. In the above, $n_i$ and $n_\alpha$ are the noise in the recorded data and derivatives, respectively.

Consider the family of functions:

$$d(x)=\sqrt{2}\cos(kx+\phi)$$

such that $$\epsilon_n = w_i(C_i+n_i) + w_\alpha(-kS_\alpha+n_\alpha) - C$$

where $C_i=\sqrt{2}\cos(kx_i+\phi)$, $S_\alpha=\sqrt{2}\sin(kx_\alpha+\phi)$, $C=\sqrt{2}\cos(ky+\phi)$ and summation is implied by repeated subscripts.

The expected value of the squared error is given by $$\epsilon^2(k,\phi)=E[\epsilon_n^2]=E[w_iw_j(C_i+n_i)(C_j+n_j)+w_\alpha w_\beta(-kS_\alpha+n_\alpha)(-kS_\beta+n_\beta)+C^2+2w_iw_\alpha(C_i+n_i)(-kS_\alpha+n_\alpha)-2w_i(C_i+n_i)C-2w_\alpha(-kS_\alpha+n_\alpha)C]$$

where $E[\ldots]$ denotes expected value. Assuming that the noise is uncorrelated at different locations, and that the noise in the data is uncorrelated with that in the derivative even at the same location, then $$\epsilon^2(k,\phi)=w_iw_j(C_iC_j+N\delta_{ij})+w_\alpha w_\beta(k^2S_\alpha S_\beta+\lambda N\delta_{\alpha\beta})+C^2-2w_iw_\alpha kC_iS_\alpha-2w_iC_iC+2w_\alpha kS_\alpha C$$

where $N$ and $\lambda N$ are the noise variances in the data and derivatives, respectively.

Given the identities $$\int\cos(a+\phi)\cos(b+\phi)d\phi=\pi\cos(a-b)$$

$$\int\cos(a+\phi)\sin(b+\phi)d\phi=-\pi\sin(a-b)$$

$$\int\sin(a+\phi)\sin(b+\phi)d\phi=\pi\cos(a-b)$$

wherein the range of integration is $0\leq\phi\leq2\pi$, the phase-averaged error spectrum (defined as previously) is given by $$\epsilon(k)^2 = (2\pi)^{-1}\int\epsilon^2(k,\varphi)d\varphi$$
$$= w_iw_j\{\cos(k\Delta_{ij})+N\delta_{ij}\} + w_\alpha w_\beta\{k^2\cos(k\Delta_{\alpha\beta})+\lambda N\delta_{\alpha\beta}\} +$$
$$1 + 2w_iw_\alpha\sin(k\Delta_{i\alpha}) -$$
$$2w_i\cos(k\Delta_i) + 2w_\alpha k\sin(k\Delta_\alpha)$$

where $\Delta_{ij}=x_i-x_j$ and $\Delta_i=x_i-y$, etc., and the range of integration is $0\leq\phi\leq2\pi$.

With wavenumber-averages also defined as previously, we have $$k_m^{-1}\int\cos(kx)dk=(k_mx)^{-1}[\sin(kx)]_0^{2\pi}=\text{sinc}(k_mx)$$

$$k_m^{-1}\int k\sin(kx)dk=-\partial_x\{k_m^{-1}\int\cos(kx)dk\}=-k_m\text{sinc}'(k_mx)$$

$$k_m^{-1}\int k^2\cos(kx)dk=\partial_x\{k_m^{-1}\int k\sin(kx)dk\}=-k_m^2\text{sinc}''(k_mx)$$

where $\partial_x$ denotes differentiation with respect to x, and $\text{sinc}'(x)$ and $\text{sinc}''(x)$ are the first and second derivatives of the sinc function respectively, both of which are non-singular at $x=0$.

The wavenumber-averaged error, is given by $$\epsilon^2 = k_m^{-1}\int\epsilon(k)^2 dk$$
$$= w_iw_j\{\text{sinc}(k_m\Delta_{ij})+N\delta_{ij}\} +$$
$$w_\alpha w_\beta\{-k_m^2\text{sinc}''(k_m\Delta_{\alpha\beta})+\lambda N\delta_{\alpha\beta}\} + 1 -$$
$$2w_iw_\alpha k_m\text{sinc}'(k_m\Delta_{i\alpha}) - 2w_i\text{sinc}(k_m\Delta_i) - 2w_\alpha k_m\text{sinc}'(k_m\Delta_\alpha)$$
$$= w^TSw - 2w^Tg + 1$$

Integrating from $0\leq k\leq k_m$ where:

$$w=\begin{pmatrix}w_i\\w_\alpha\end{pmatrix}, S=\begin{pmatrix}s_{ij} & s_{i\beta}\\s_{\alpha j} & s_{\alpha\beta}\end{pmatrix}, g=\begin{pmatrix}g_i\\g_\alpha\end{pmatrix}$$

and $$S_{ij}=\text{sinc}(k_m\Delta_{ij})+N\delta_{ij}$$

$$S_{i\alpha}=-k_m\text{sinc}'(k_m\Delta_{i\alpha})$$

$$S_{\alpha i}=-k_m\text{sinc}'(k_m\Delta_{i\alpha})$$

$$S_{\alpha\beta}=-k_m^2\text{sinc}''(k_m\Delta_{\alpha\beta})+\lambda N\delta_{\alpha\beta}$$

$$g_i=\text{sinc}(k_m\Delta_i)$$

$$g_\alpha=k_m\text{sinc}'(k_m\Delta_\alpha)$$

In accordance with previous notation, the argument k on $\epsilon$ is dropped to indicate the averaging over k. S is symmetrical and depends only on the maximum wavenumber $k_m$ and the irregular locations.

Differentiating the wavenumber-averaged error with respect to w and setting the derivatives equal to zero gives a simple linear system for the unknown weights, namely:

$$Sw=g$$

which can be solved simply by inverting S. When the operator w is designed such that it satisfies the equation $Sw=g$ then the equation for the wavenumber averaged error reduces to:

$$\epsilon^2=1-w^Tg$$
$$=1-g^TS^{-1}g$$

Because $$\text{sinc}(x)=\sin(x)/x=1-x^2/6+x^4/120-x^6/840+\ldots$$

$$\text{sinc}'(x)=\{\cos(x)-\text{sinc}(x)\}/x=-x/3+x^3/30-x^5/140+\ldots$$

$$\text{sinc}''(x)=\{-\sin(x)-2\text{sinc}'(x)\}/x=-1/3+x^2/10-x^4/28+\ldots$$

the diagonal elements of S are $1+N$ (first $n_d$ terms) and $k_m^2/3+\lambda N$ (remaining $n_g$ terms), respectively. N is essentially equivalent to the usual white noise parameter, and $\lambda$ defines the relative noise level in the derivatives compared to that in the data. For large $\lambda$, the interpolated data will tend to depend on the data, rather than the derivatives.

When $k_m=0$, we have $S_{ij}=1+N\delta_{ij}$, $S_{i\alpha}=S_{\alpha i}=0$, $S_{\alpha\beta}=\lambda N\delta_{\alpha\beta}$, $g_i=1$ and $g_\alpha=0$, such that the solution is $w_i=1/(n_d+N)$ and $v_\alpha=0$, as expected.

In general, in nD, d(x) is a product of cosine functions in each direction, and each derivative datum represents a derivative of this in a specific direction, which may or may not be aligned with a principle axis. The derivative of d(x) in this direction therefore consists of a sum of terms, each one being a product of (n−1) cosines and a single sine. It is possible to extend the above treatment to a case when both the inline and crossline derivatives are used, to take into account curving of the cable. The matrices above will contain terms each of which is a linear combination of products of sinc functions and their derivatives.

It is further possible to treat the pressure and its derivative as complex numbers, thus taking into account both phase and amplitude. In this case, we consider basis functions $e^{i(kx+\phi)}$, allow the operators to be complex and use an asymmetric wavenumber range for the wavenumber averaging (i.e., averaging from $k_1$ to $k_2$ rather than 0 to $k_m$).

Figure 6:
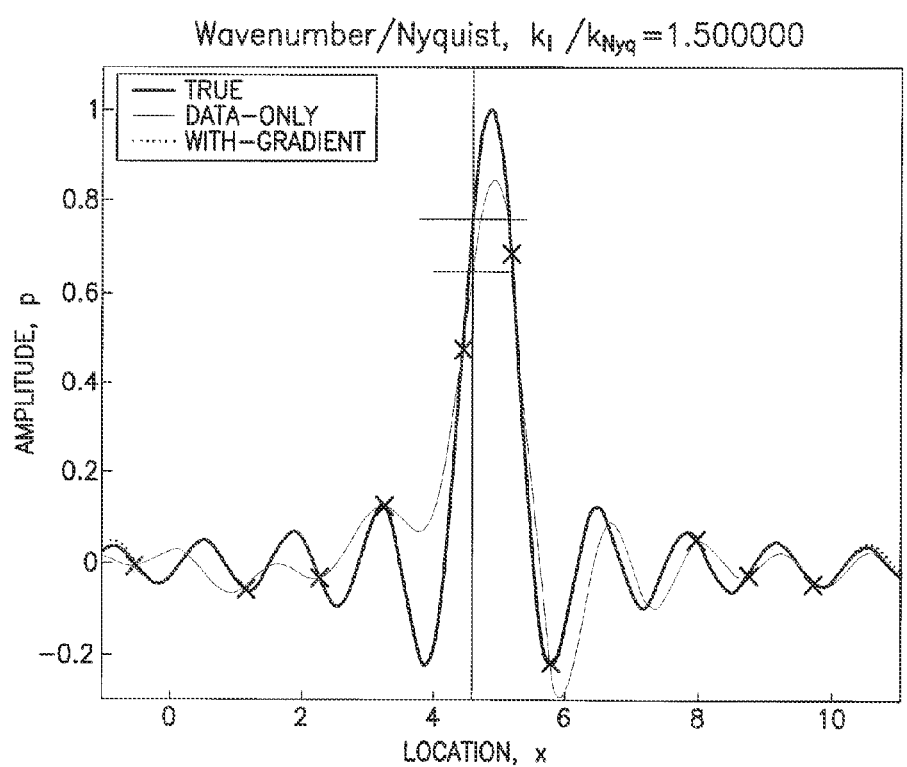
FIG. 6 shows a comparison of interpolated functions using data only and using data and gradients.

FIG. 6 compares interpolation results for data-only and with-gradient operators. The irregular locations were computed by adding random variations with a uniform distribution on the interval [−0.5,0.5] to regular locations, x=0, 1, . . ., 10. Noise-free data and gradient information were supplied at the same locations, indicated by the markers. The true curve shows the underlying function being interpolated, which is a sinc function with maximum wavenumber ($k_f$) equal to 1.5 $k_{Nyq}$, where $k_{Nyq}$ is the Nyquist corresponding to the average sample interval. The peak of the sinc function is located at a random location taken from a uniform distribution on the interval [4.5,5.5]. The reason for using a random location for this peak is to avoid biases in the ensemble averaging (described later) associated with a correspondence between the peak location and regular data locations.

Interpolation operators were designed using $k_m=1.6k_{Nyq}$. The "data only" curve shows the interpolating function for the data-only operator. As expected, there are significant errors because the data are aliased. Note though that the interpolating function does interpolate the supplied data. The "with-gradient" curve is the corresponding function for the with-gradient operator, and it is near perfect.

Figure 7:
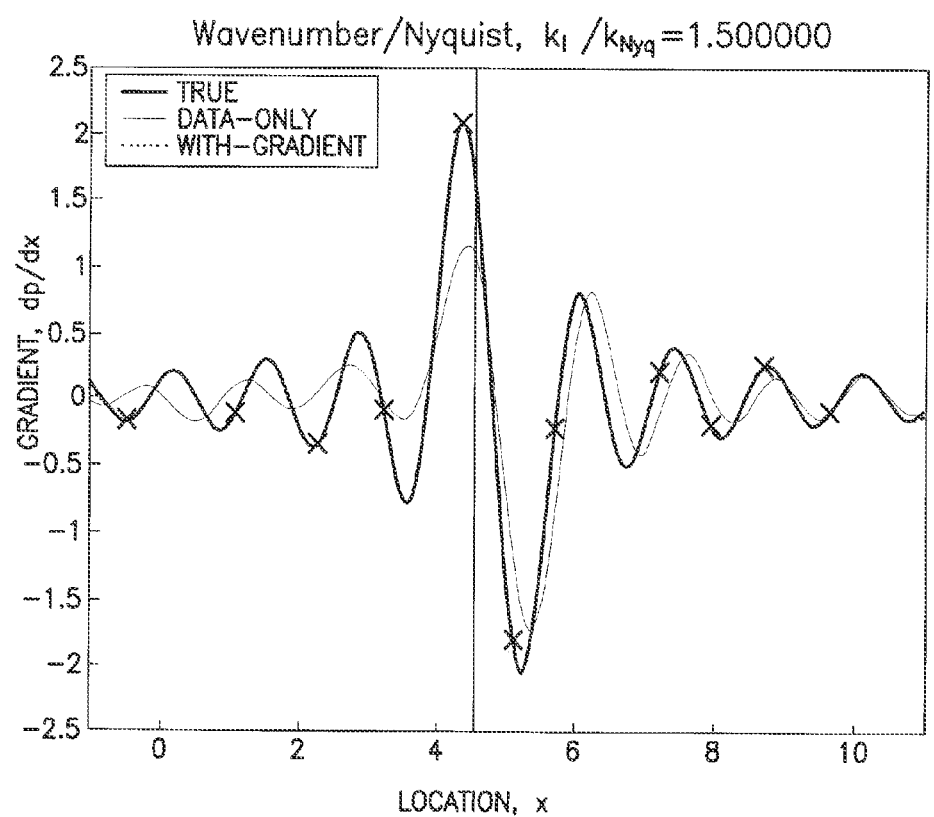
FIG. 7 shows a comparison of gradients of interpolated functions using operators calculated using data only and data with gradients.

FIG. 7 shows the gradients of the interpolated functions. The "true" curve is the true gradient and the markers show the supplied gradient information. The "data only" and "with-gradient" curves show the gradients of the interpolated functions for the data-only and with-gradient algorithms respectively. The "data only" curve shows significant error because it does not use the gradient information. The "with-gradient" curve does use the gradient information and properly interpolates the gradients.

In order to remove the impact of having a specific set of irregular locations on the results, ensemble averaging was performed. A specific output location, indicated by the vertical bars in FIGS. 6 and 7, was chosen. In order to avoid bias, the output location was chosen to be displaced from the peak of the sinc function by a random amount with uniform distribution on the interval [−0.5,0.5]. The errors at this location, indicated by the horizontal bars in FIG. 6, were computed for each of the 1000 instances in the ensemble and are plotted in FIG. 8 for the first 200 instances. The benefits of using the gradient information are clear.

Figure 8:
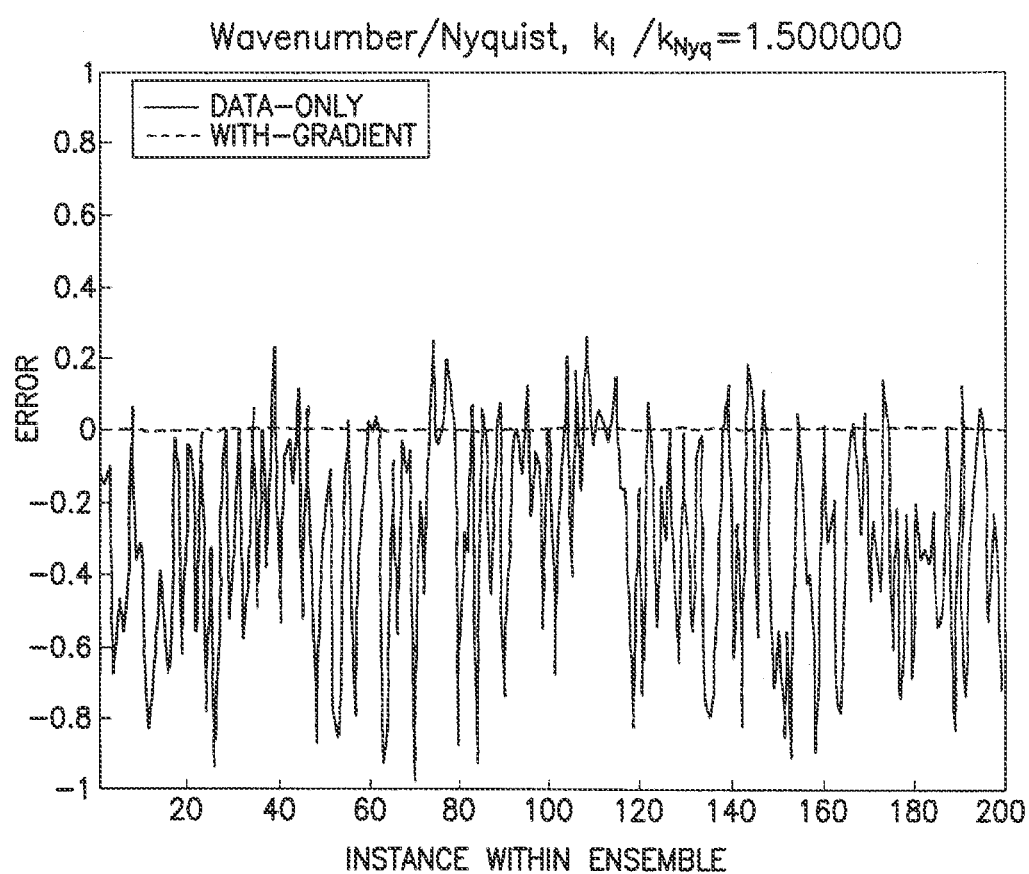
FIG. 8 shows a comparison of errors within an ensemble for data only and data with gradient operators.

It should be noted that the errors plotted in FIG. 8 (actual errors) are not the same as the error, $\epsilon$, defined above. In particular, the actual errors depend on the function being interpolated, whereas $\epsilon$ depends only on the maximum wavenumber used for the operator design. The reason for using actual errors in this example is that, when the data or gradients are noisy, the actual errors give a true measure of the error in the interpolated function. In contrast, $\epsilon$ only knows about the noise levels in the data and gradients through the supplied values for the noise variances (N and $\lambda$), which may be in error.

Figure 9:
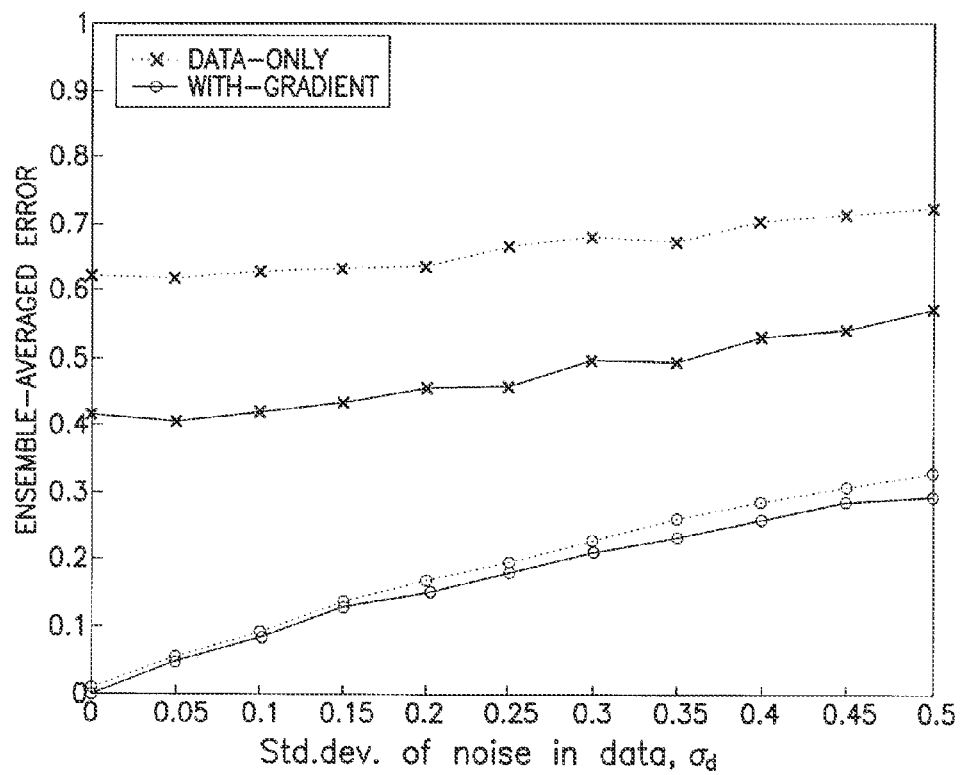
FIG. 9 illustrates the dependence of ensemble averaged errors on the noise levels in the data when the gradients are noise free.

The impact of noise on the accuracy of the interpolation is extremely important. FIG. 9 shows the dependence of the interpolation error on the standard deviation of the noise level in the data, $\sigma_d$, for $k_f=1.5k_{Nyq}$. The noise was random and Gaussian with zero mean. The gradients are noise-free. In all cases, the noise variance was assumed known for the operator design, such that the operator should be optimal in terms of $\epsilon$. As expected, the interpolation error increases as the noise increases and the gradient information provide a significant reduction in the error.

Figure 10:
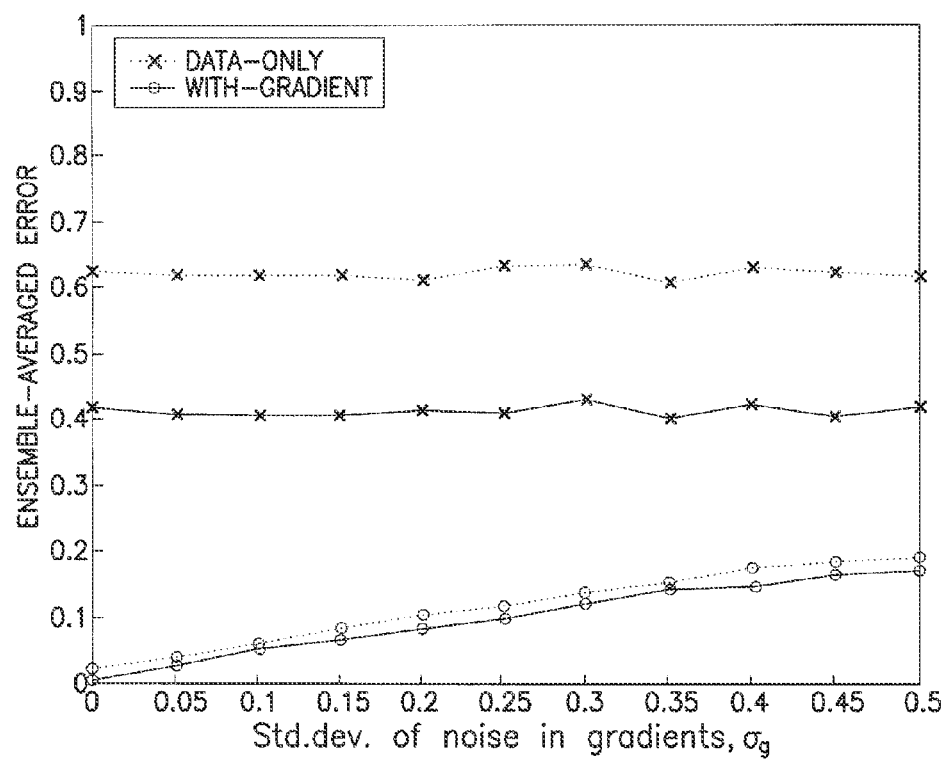
FIG. 10 shows the dependence of ensemble averaged errors on the noise levels in the gradients when the data is noise free.

FIG. 10 shows the corresponding graph when the errors are in the gradients, rather than the data. The error for the data-only operator is constant. This is to be expected because the gradients are not used. The error for the with-gradient operator grows with increasing noise level, but remains below that for the data-only operator. If the gradients are made very noisy, then the errors would become equal because the gradients would not be used in the interpolation. This last statement assumes that it is known that the gradients are very noisy, otherwise the with-gradient operator may be worse than the data-only operator because the former operator would try too hard to honor the gradients.

The present invention has been described particularly with regard to spatial interpolation of marine seismic data. However, the present invention may be used with any data processing algorithm which uses pressure gradient data in which move-out correction is applied prior to the algorithm, either because the algorithm makes a zero offset assumption or because it is beneficial for the algorithm to operate on move-out corrected data to reduce aliasing. In the latter case, the move-out correction need not be full correction to zero offset.

In the foregoing description, for the purposes of illustration, various methods and/or procedures were described in a particular order. It should be appreciated that in alternate embodiments, the methods and/or procedures may be performed in an order different than that described. It should also be appreciated that the methods described above may be performed by hardware components and/or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable media, such as CD-ROMs or other type of optical disks, floppy diskettes, ROMs, RAMs, EPROMs, EEPROMs, magnetic or optical cards, flash memory, or other types of machine-readable media suitable for storing electronic instructions. Merely by way of example, some embodiments of the invention provide software programs, which may be executed on one or more computers, for performing the methods and/or procedures described above. In particular embodiments, for example, there may be a plurality of software components configured to execute on various hardware devices. Alternatively, the methods may be performed by a combination of hardware and software.

Hence, while detailed descriptions of one or more embodiments of the invention have been given above, various alternatives, modifications, and equivalents will be apparent to those skilled in the art without varying from the scope of the invention. Moreover, except where clearly inappropriate or otherwise expressly noted, it should be assumed that the features, devices and/or components of different embodiments can be substituted and/or combined. Thus, the above description should not be taken as limiting the scope of the invention, which is defined by the appended claims.

What is claimed is:

1. A processor implemented method for processing seismic data including measurement data and gradients of the measurement data for a geophysical survey, comprising:

receiving the measurement data from a plurality of seismic receivers, the plurality of seismic receivers are arranged along a seismic streamer configured in use to be towed behind a boat through a body of water and the plurality of seismic streamers comprise geophones and/or hydrophones, and wherein the receivers are configured to measure seismic energy generated by an interaction between a seismic signal produced by a seismic source and a subterranean section of the earth;

using a non-transitory computer readable medium containing computer instructions stored therein, for causing a computer processor to perform the following processes:

deriving gradients of the measurement data;

deriving a first term by applying a move-out correction function to the measurement data, wherein the move-out correction function is configured to compensate for offset between the seismic source and the seismic receivers and comprises a velocity function selected to match a velocity of the seismic energy traveling through the earth and the body of water;

deriving a second term by applying the move-out correction function to the gradients; and deriving gradients of move-out corrected data by adding the first term and the second term.

2. The method of claim 1, wherein the measurement data comprises pressure data.

3. The method of claim 2, wherein the measurement data further comprises: data of at least one component of displacement, data of at least one component of velocity, or data of at least one component of acceleration.

4. The method of claim 1, wherein the measurement data comprises data of at least one component of displacement, data of at least one component of velocity; or data of at least one component of acceleration.

5. The method of claim 4, wherein computing gradients of measurement data comprises:

computing gradients of pressure data by multiplying density and acceleration at the location of the pressure data.

6. The method of claim 1, wherein computing gradients of measurement data comprises:

computing gradients of measurement data by differentiation of the measurement data with regard to spatial directions.

7. The method of claim 2, wherein deriving the first term further comprises:

a) computing a time-derivative of the pressure data by differentiation of the pressure data with regard to time;

b) applying the move-out correction function to the time-derivative of the pressure data;

c) computing a gradient of the move-out correction function; and d) multiplying the results of steps (b) and (c) to derive the first term.

8. The method of claim 1 wherein the move-out correction function is a hyperbolic function.

9. The method of claim 1, further comprising:

spatially interpolating measurement data using:

the move-out corrected measurement data, which is derived by applying move-out correction function to the measurement data, and gradients of the move-out corrected data.

10. The method of claim 9, wherein the spatially interpolating comprises applying an interpolation operator calculated by assuming that an interpolated measurement data comprises a linear combination of the known measurement data at locations $x_i$ and the gradients at locations $x\alpha$, with operator coefficients $w_i$ and $w\alpha$, respectively; and calculating the coefficients by minimizing an error function.

11. The method of claim 10, wherein minimizing the error function comprises using a least squares method.

12. The method of claim 10, wherein the operator includes a factor relating to the noise level in the known values.

13. The method of claim 10, wherein the measurement data comprises marine data acquired using a plurality of substantially parallel streamers and the method is used to interpolate data points between the streamers.

14. The method of claim 1, wherein the measurement data is in the form of shot gathers.

15. The method of claim 4, wherein pressure data is calculated from measurement data of particle velocity or acceleration and used as measurement data for pressure.

* * * * *